(12) United States Patent
Qin

(10) Patent No.: US 11,318,938 B2
(45) Date of Patent: May 3, 2022

(54) SPEED PLANNING METHOD AND APPARATUS FOR SELF-DRIVING, DEVICE, MEDIUM AND VEHICLE

(71) Applicant: BAIDU ONLINE NETWORK TECHNOLOGY (BEIJING) CO., LTD., Beijing (CN)

(72) Inventor: Wenchuang Qin, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 17/393,794

(22) Filed: Aug. 4, 2021

(65) Prior Publication Data

US 2021/0362714 A1 Nov. 25, 2021

(30) Foreign Application Priority Data

Nov. 6, 2020 (CN) .......................... 202011231666.X

(51) Int. Cl.
   *B60W 60/00* (2020.01)
   *B60W 30/14* (2006.01)
   *B60W 40/105* (2012.01)
   *G06N 3/02* (2006.01)

(52) U.S. Cl.
   CPC ........ *B60W 30/143* (2013.01); *B60W 40/105* (2013.01); *B60W 60/001* (2020.02); *G06N 3/02* (2013.01); *B60W 2520/105* (2013.01)

(58) Field of Classification Search
   CPC ............. B60W 30/143; B60W 40/105; B60W 60/001; B60W 2520/105; G06N 3/02
   USPC ........................................................ 701/93
   See application file for complete search history.

(56) References Cited

U.S. PATENT DOCUMENTS

2019/0265713 A1* 8/2019 Zhou .................... B60W 30/16
2020/0090042 A1* 3/2020 Wayne ................. G06N 3/0445

OTHER PUBLICATIONS

Berrut et al., Barycentric Lagrange Interpolation, Jun. 2004, Society for Industrial and Applied Mathematics, SIAM Review, vol. 46, Issue 3 (Year: 2004).*
S. Davies., "Multidimensional Triangulation and Interpolation for Reinforcement Learning" Advances in Neural Infomnation Processing Systems 9 (NIPS 1996).
A. Sharma, Q. Zheng and M. M. Noel, "Improved reinforcement learning for cargo ship steering control," 2017 36th Chinese Control Conference (CCC), 2017, pp. 10023-10028, doi: 10.23919/ChiCC.2017.8028956.

(Continued)

*Primary Examiner* — Nadeem Odeh
(74) *Attorney, Agent, or Firm* — Kacvinsky Daisak Bluni PLLC

(57) ABSTRACT

Provided are a speed planning method and apparatus for self-driving, a device and a medium, relating to artificial intelligence technologies such as self-driving and deep learning. The solution includes acquiring the current state of a vehicle and interpolating actions based on the current state and a predetermined state table to obtain the target action of the current state. The current state includes at least the remaining running distance and the current speed. The state table is determined based on a reinforcement learning method and includes multiple states and an action performed in each state. The action performed in each state includes at least acceleration.

13 Claims, 3 Drawing Sheets

S101 — Acquire the current state of a vehicle, where the current state includes at least the remaining running distance and the current speed S102 — Interpolate actions based on the current state and a predetermined state table to obtain the target action of the current state, where the state table is determined based on a reinforcement learning method and includes multiple states and a respective action performed in each state, and the action performed in each state includes at least acceleration

(56) References Cited

OTHER PUBLICATIONS

Ling C.X., Buchal R. (1993) Learning to control dynamic systems with automatic quantization. In: Brazdil P.B. (eds) Machine Learning: ECML-93. ECML 1993. Lecture Notes in Computer Science (Lecture Notes in Artificial Intelligence), vol. 667. Springer, Berlin, Heidelberg, https://doi.org/10.1007/3-540-56602-3_153.
Munos et al., "Barycentric Interpolators for Continuous Space & Time Reinforcement Learning" Advances in Neural Information Processing Systems, vol. 11, Nov. 30, 1998.
European Search Report and Written Opinion for the European Patent Application No. EP21187624, dated Feb. 15, 2022, 10 pages.

* cited by examiner

SPEED PLANNING METHOD AND APPARATUS FOR SELF-DRIVING, DEVICE, MEDIUM AND VEHICLE

CROSS-REFERENCE TO RELATED APPLICATION(S)

This application claims priority to Chinese Patent Application No. 202011231666.X filed Nov. 6, 2020, the disclosure of which is incorporated herein by reference in its entirety.

TECHNICAL FIELD

The present application relates to the field of artificial intelligence technologies, and especially relates to self-driving and deep learning, specifically a speed planning method and apparatus for self-driving, a device, a medium and a vehicle.

BACKGROUND

In the field of self-driving, speed planning is required for a self-driving vehicle. Speed planning algorithms in the related art are generally divided into single-time control and multi-time planning.

Single-time control means that the desired speed to be reached is calculated based on distance and speed information at the current time. However, single-time control cannot ensure the global optimal solution of the speed and may bring about a potential risk like excessively sharp braking near an end point. Multi-time planning requires an optimization algorithm or an online track screening algorithm. However, a large amount of calculation is required for these algorithms, and the calculation time is limited. As a result, the global optimal solution of the speed cannot be ensured.

SUMMARY

In a first aspect, the present application provides a speed planning method for self-driving. The method includes acquiring the current state of a vehicle and interpolating actions based on the current state and a predetermined state table to obtain the target action of the current state. The current state includes at least the remaining running distance and the current speed. The state table is determined based on a reinforcement learning method and includes multiple states and a respective action performed in each state. The respective action performed in each state includes at least acceleration.

In a second aspect, the present application further provides a speed planning apparatus for self-driving. The apparatus includes a state acquisition module and an interpolation module.

The state acquisition module is configured to acquire the current state of a vehicle. The current state includes at least the remaining running distance and the current speed.

The interpolation module is configured to interpolate actions based on the current state and a predetermined state table to obtain the target action of the current state. The state table is determined based on a reinforcement learning method and includes multiple states and a respective action performed in each state. The respective action performed in each state includes at least acceleration.

In a third aspect, the present application further provides an electronic device. The electronic device includes at least one processor and a memory communicatively connected to the at least one processor.

The memory stores instructions executable by the at least one processor to enable the at least one processor to perform the speed planning method for self-driving according to any embodiment of the present application.

In a fourth aspect, the present application further provides a non-transitory computer-readable storage medium. The storage medium stores computer instructions for causing a computer to perform the speed planning method for self-driving according to any embodiment of the present application.

In a fifth aspect, the present application further provides a vehicle including a vehicle body. The vehicle body is provided with the electronic device according to any embodiment of the present application.

It is to be understood that the content described in this part is neither intended to identify key or important features the present application nor intended to limit the scope of the present application. Other features of the present application are apparent from the description provided hereinafter. Other effects of the preceding optional implementations are described hereinafter in conjunction with embodiments.

BRIEF DESCRIPTION OF DRAWINGS

The drawings are intended to provide a better understanding of the present solution and not to limit the present application.

DETAILED DESCRIPTION

Example embodiments of the present application, including details of embodiments of the present application, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present application. Similarly, description of well-known functions and structures is omitted hereinafter for clarity and conciseness.

Figure 1:
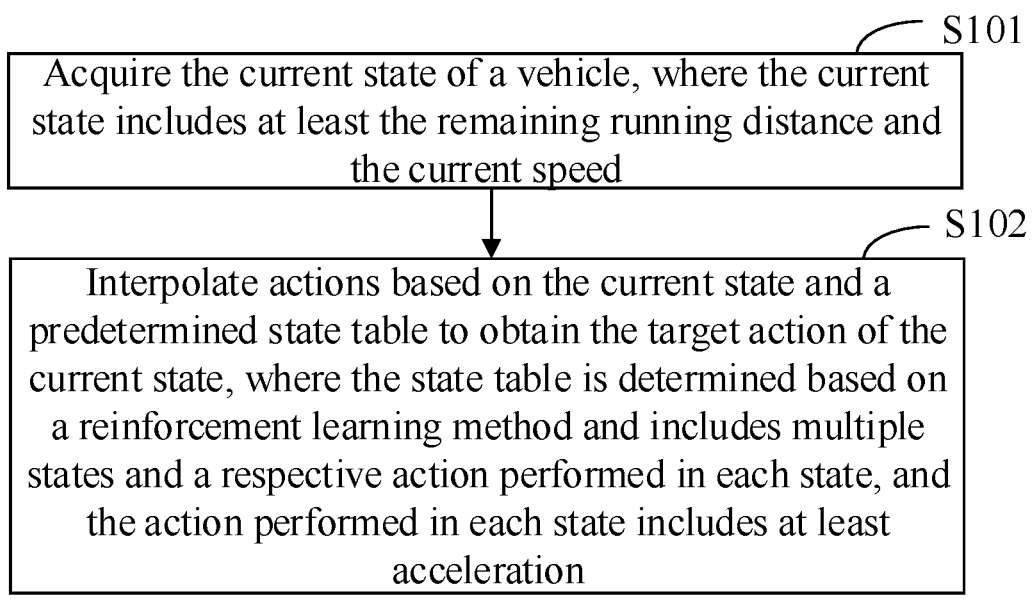
FIG. 1 is a flowchart of a speed planning method for self-driving according to an embodiment of the present application.

FIG. 1 is a flowchart of a speed planning method for self-driving according to an embodiment of the present application. This embodiment is applicable to a case where speed planning, for example, planning of running acceleration, is provided for a self-driving device, relating to artificial intelligence technologies such as self-driving and deep learning. The method can be performed by a speed planning apparatus for self-driving. The apparatus is implemented by software and/or hardware and may be configured in an electronic device such as a computer device. As shown in FIG. 1, the method includes the steps below.

In S101, the current state of a vehicle is acquired, where the current state includes at least the remaining running distance and the current speed.

Speed planning for self-driving may generally refer to acceleration planning. Acceleration planning needs to be performed from a global planning perspective based on the current state of the vehicle, that is, the remaining running distance and the current speed of the vehicle. The different state corresponds to the different speed planning.

The remaining running distance may be a distance to a front fixed point (destination) towards which the self-driving vehicle is running. In this case, the speed in the state is an absolute speed, that is, the current running speed of the self-driving vehicle. Additionally, on the basis of sensing of an obstacle in front of the self-driving vehicle, the remaining running distance may also be a relative distance to the obstacle from the self-driving vehicle. When the obstacle is also a running vehicle, the speed in the state is a relative speed, that is, the speed of the self-driving vehicle relative to the obstacle vehicle. Therefore, the current state of the self-driving vehicle may be flexibly determined according to different application scenarios.

Additionally, the state may further include another dimension: road slope gradient. Table lookup based on the remaining running distance, the current speed and the slope gradient is applicable to a road surface having a slope and enables accurate speed planning on a road surface having a slope. Of course, other dimensions may be added to the state as applicable to different application scenarios such as running under a more complex road condition. This is not limited in this embodiment of the present application.

In S102, actions are interpolated based on the current state and a predetermined state table so that the target action of the current state is obtained, where the state table is determined based on a reinforcement learning method and includes multiple states and a respective action performed in each state, and the respective action performed in each state includes at least acceleration.

The state table may be predetermined offline so that not excessive computing resources are occupied during real-time online speed planning. The state table includes multiple states and a respective action performed in each state. That is, based on reinforcement learning, optimal actions performed in different states in the global planning are determined, and then a state table is formed. The respective action performed in each state may include acceleration. In this manner, the optimal action to be selected in the current state can be determined online in real time by table lookup.

It is to be noted that since states in an actual scenario are continuous while states in the state table determined offline are discrete, it is necessary to determine the target action by interpolation. It is feasible to first determine the position of the current state in the state table by table lookup, then to determine actions corresponding to states adjacent to the current state, and finally to determine the target action corresponding to the current state by interpolating these actions.

Thereby, in this embodiment of the present application, table lookup replaces a related neural network, and it is feasible to determine the state table offline based on reinforcement learning and then perform speed planning online by table lookup. In this manner, fewer computing resources are occupied, and the problem in which the prediction result cannot be anticipated due to incomplete training of the neural network is avoided. Moreover, the state table can be easily modified by a person skilled in the art at any time due to being visible and highly interpretable in practice and is applicable to a wider range due to being highly controllable and designable.

With the solution of this embodiment of the present application, table lookup replaces the related neural network. It is possible to determine the target action of the current state simply by determining the global-planning state table offline based on reinforcement learning, performing table lookup online and then interpolating actions. Therefore, not only not a large number of computing resources are occupied, but the global optimal solution of speed planning can also be obtained. Moreover, interpretability and mass production are ensured.

Figure 2:
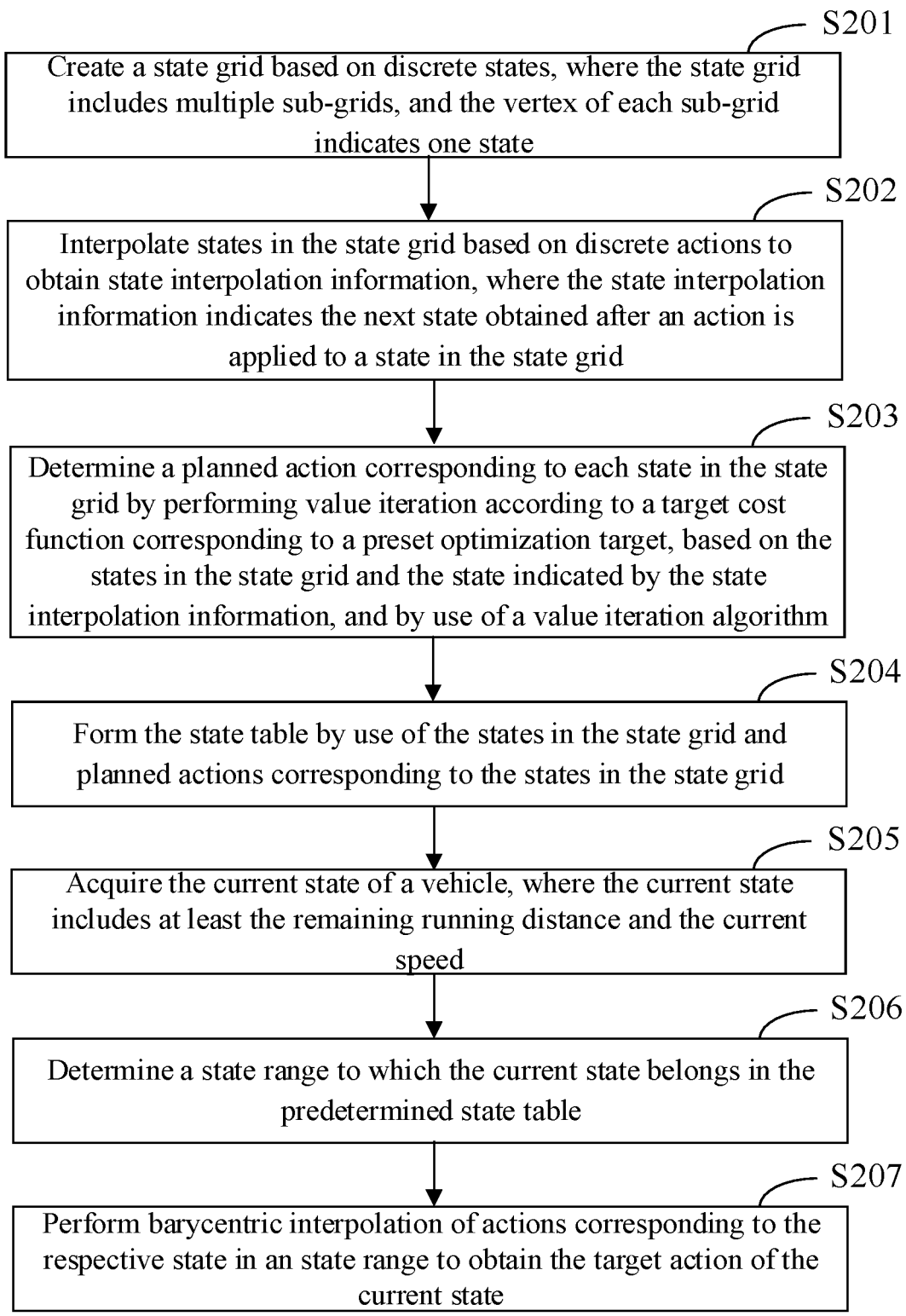
FIG. 2 is a flowchart of a speed planning method for self-driving according to an embodiment of the present application.

FIG. 2 is a flowchart of a speed planning method for self-driving according to an embodiment of the present application. This embodiment is an improvement on the preceding embodiment. As shown in FIG. 2, the method includes the steps below.

In S201, a state grid is created based on discrete states, where the state grid includes multiple sub-grids, and the vertex of each sub-grid indicates one state.

A distance boundary and a speed boundary are pre-acquired. Then distances in a distance range formed by the distance boundary are discretized, and speeds in a speed range formed by the speed boundary are discretized. The discretized distances and speeds form multiple discrete states. The discrete states form a state grid. For example, the abscissa axis indicates a distance, and the ordinate axis indicates a speed. After discretization, discretized points on the abscissa axis and the ordinate axis form one grid. Each point in the grid can indicate one state. Every four adjacent points in the grid can form one sub-grid.

Additionally, in practical use, to facilitate algorithm calculation, the state grid may be processed into a two-dimensional state matrix. One dimension is distance, and the other dimension is speed.

In S202, states in the state grid are interpolated based on discrete actions so that state interpolation information is obtained, where the state interpolation information indicates the next state obtained after an action is applied to a state in the state grid.

Similarly, an action boundary is pre-acquired. Then actions in an action range formed by the action boundary are discretized so that discrete actions are obtained. All discrete actions are applied to each of the discrete states in the state grid separately. The next state of each state in the state grid can be obtained for each discrete action applied. The next state is recorded in the following manner: States in the state grid are interpolated, and state interpolation information is determined. Therefore, the state interpolation information can indicate the next state obtained after an action is applied to a state in the state grid. Moreover, state interpolation information is recorded after each discrete action is applied. An initial discrete state grid is interpolated so that a more continuous state is obtained. On this basis, a value iteration algorithm is performed so that the optimal action is determined. In this manner, continuity of the planned actions and the accuracy of speed planning can be ensured.

In one embodiment, barycentric interpolation of states in the state grid is performed based on discrete actions so that state interpolation information is obtained. Barycentric interpolation is low in calculation complexity for not requiring an interpolating polynomial and is high in interpolation precision, ensuring continuity of the interpolation. For example, the next state obtained after an action is applied usually falls within the state grid or on the state grid, that is, within a sub-grid of the state grid or on a sub-grid of the state grid. Since one sub-grid has four vertexes, it is feasible to perform barycentric interpolation according to states of three vertexes in the upper left corner to obtain state interpolation information of the next state and then it is feasible to record, in the state interpolation information, indexes of the states of the three vertexes in all states and the positional relationship between the point of the next state and the three vertexes.

In S203, a planned action corresponding to each state in the state grid is determined in the following manner: Value iteration is performed according to a target cost function corresponding to a preset optimization target, based on the states in the state grid and the state indicated by the state interpolation information, and by use of a value iteration algorithm.

The optimization target of the value iteration is to obtain the optimal action corresponding to the discrete states in the state grid by iteration. The target cost function includes a state cost function and an action cost function. For example, the weighted sum of the state cost function and the action cost function may be calculated so that the final target cost function is obtained. Moreover, the cost function is not limited to a quadratic function. The cost function may be a non-linear cost function such as a higher-order function or a tanh function.

Overall, in an iteration process, all discrete actions a(n) are applied to each discrete state s(n) so that the next state s(n+1) of each state is obtained. Then the evaluation value of the next state is calculated based on the target cost function. Then the action a(n+1) corresponding to the optimal value (for example, the maximum value) is selected from among all evaluation values by iteration, and a(n) is replaced by a(n+1). If the difference between evaluation values in two iterations is less than 1e−6, the optimal evaluation value and the corresponding action are considered to be obtained. Details about value iteration algorithms and processes are not described here.

In S204, the state table is formed by use of the states in the state grid and planned actions corresponding to the states in the state grid.

Through the value iteration algorithm, it is possible to obtain globally planned actions, that is, the optimal action performed in each state in the state grid.

In S205, the current state of a vehicle is acquired, where the current state includes at least the remaining running distance and the current speed.

In S206, a state range to which the current state belongs is determined in the predetermined state table.

In S207, barycentric interpolation of actions corresponding to the respective states in the state range is performed so that the target action of the current state is obtained.

Since states and actions in the state table are discrete while states in practical application are continuous, only by interpolating the actions can the target action corresponding to each real-time state be determined. It is feasible to determine the position of the current state in the state table by table lookup. For example, it is feasible to determine the sub-grid to which the current state belongs in the state table. The state range to which the current state belongs can be determined simply based on the four vertexes of the sub-grid. Then the optimal target action in the current state can be obtained simply by barycentric interpolation of actions based on the position of the current state in the sub-grid and actions corresponding to states of the three vertexes in the upper left corner of the sub-grid.

With the solution of this embodiment of the present application, a related network-model-based reinforcement learning method is discarded, and table lookup replaces a neural network. It is possible to perform speed planning simply by determining the state table offline and then performing query online. Therefore, not only not a large number of computing resources are occupied, but the global optimal solution of speed planning can also be obtained. Moreover, interpretability and mass production are ensured. Additionally, when the value iteration algorithm is performed, the original state grid is interpolated so that a more continuous state is obtained. On this basis, the value iteration algorithm is performed so that the optimal action is determined. In this manner, continuity of the planned actions and the accuracy of speed planning can be ensured.

Figure 3:
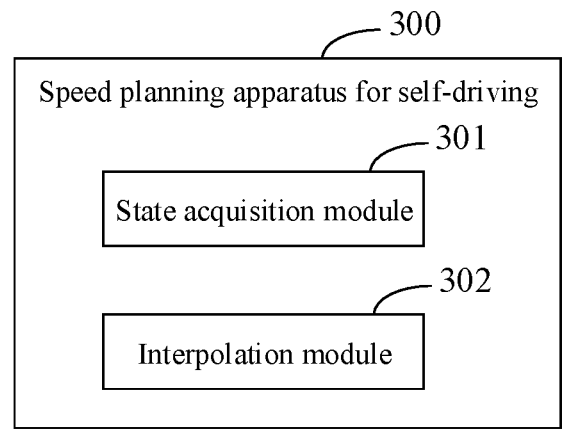
FIG. 3 is a diagram illustrating the structure of a speed planning apparatus for self-driving according to an embodiment of the present application.

FIG. 3 is a diagram illustrating the structure of a speed planning apparatus for self-driving according to an embodiment of the present application. This embodiment is applicable to a case where speed planning, for example, planning of running acceleration, is provided for a self-driving device, relating to artificial intelligence technologies such as self-driving and deep learning. The apparatus can perform the speed planning method for self-driving according to any embodiment of the present application. As shown in FIG. 3, the apparatus 300 includes a state acquisition module 301 and an interpolation module 302.

The state acquisition module 301 is configured to acquire the current state of a vehicle. The current state includes at least the remaining running distance and the current speed.

The interpolation module 302 is configured to interpolate actions based on the current state and a predetermined state table to obtain the target action of the current state. The state table is determined based on a reinforcement learning method and includes multiple states and a respective action performed in each state. The respective action performed in each state includes at least acceleration.

In one embodiment, the apparatus further includes a state table determination module. The state table determination module includes a state grid creation unit, a state interpolation unit, a value iteration unit and a state table determination unit.

The state grid creation unit is configured to create a state grid based on discrete states. The state grid includes multiple sub-grids. The vertex of each sub-grid indicates one state.

The state interpolation unit is configured to interpolate states in the state grid based on discrete actions to obtain state interpolation information. The state interpolation information indicates the next state obtained after an action is applied to an state in the state grid.

The value iteration unit is configured to determine a planned action corresponding to each state in the state grid by performing value iteration according to a target cost function corresponding to a preset optimization target, based on the states in the state grid and the state indicated by the state interpolation information, and by use of a value iteration algorithm.

The state table determination unit is configured to form the state table by use of the states in the state grid and planned actions corresponding to the states in the state grid.

In one embodiment, the state interpolation unit is configured to perform barycentric interpolation of the states in the state grid based on the discrete actions to obtain the state interpolation information.

In one embodiment, the target cost function includes a state cost function and an action cost function.

In one embodiment, the interpolation module 302 includes a table lookup unit and an action interpolation unit.

The table lookup unit is configured to determine a state range to which the current state belongs in the predetermined state table.

The action interpolation unit is configured to perform barycentric interpolation of actions corresponding to respective states in the state range to obtain the target action of the current state.

The speed planning apparatus 300 for self-driving according to this embodiment of the present application can perform the speed planning method for self-driving according to any embodiment of the present application and has function modules and beneficial effects corresponding to the performed method. For content not described in detail in this embodiment, see description in any method embodiment of the present application.

According to an embodiment of the present application, the present application further provides an electronic device and a readable storage medium.

Figure 4:
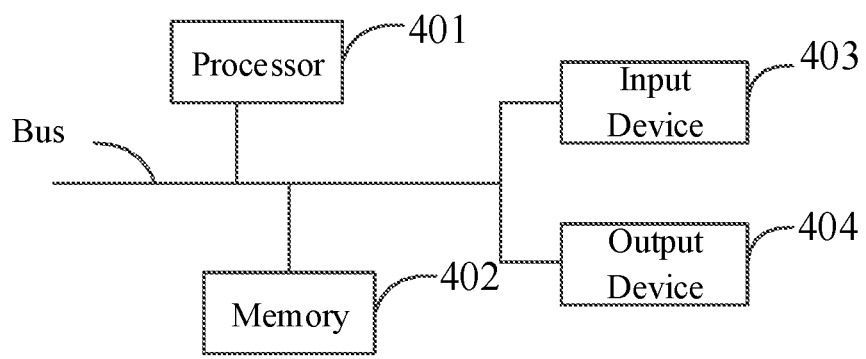
FIG. 4 is a block diagram of an electronic device for performing the speed planning method for self-driving according to an embodiment of the present application.

FIG. 4 is a block diagram of an electronic device for performing the speed planning method for self-driving according to an embodiment of the present application. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present application as described and/or claimed herein.

As shown in FIG. 4, the electronic device includes one or more processors 401, a memory 402, and interfaces for connecting components, including a high-speed interface and a low-speed interface. The components are interconnected to each other by different buses and may be mounted on a common mainboard or in other manners as desired. The processor may process instructions executed in the electronic device, including instructions stored in or on the memory to make graphic information of a GUI displayed on an external input/output device (for example, a display device coupled to an interface). In other embodiments, if required, multiple processors and/or multiple buses may be used with multiple memories. Similarly, multiple electronic devices may be connected, each providing some necessary operations (for example, a server array, a set of blade servers or a multi-processor system). FIG. 4 shows one processor 401 by way of example.

The memory 402 is the non-transitory computer-readable storage medium provided in the present application. The memory stores instructions executable by at least one processor to cause the at least one processor to perform the speed planning method for self-driving according to the present application. The non-transitory computer-readable storage medium of the present application stores computer instructions for causing a computer to perform the speed planning method for self-driving according to the present application.

The memory 402 as a non-transitory computer-readable storage medium is configured to store non-transitory software programs, non-transitory computer-executable programs, and modules, for example, program instructions/modules (for example, the state acquisition module 301 and the interpolation module 302 shown in FIG. 3) corresponding to the speed planning method for self-driving according to any embodiment of the present application. The processor 401 executes non-transitory software programs, instructions and modules stored in the memory 402 to execute the various function applications and data processing of a server, that is, implement the speed planning method for self-driving according to any preceding method embodiment.

The memory 402 may include a program storage region and a data storage region. The program storage region may store an operating system and an application program required by at least one function. The data storage region may store data created based on the use of the electronic device for performing the speed planning method for self-driving. Additionally, the memory 402 may include a high-speed random-access memory and a non-transient memory, for example, at least one disk memory, a flash memory or another non-transient solid-state memory. In some embodiments, the memory 402 includes memories disposed remote from the processor 401, and these remote memories may be connected, through a network, to the electronic device for performing the speed planning method for self-driving. Examples of the preceding network include, but are not limited to, the Internet, an intranet, a local area network, a mobile communication network and a combination thereof.

The electronic device for performing the speed planning method for self-driving according to any embodiment of the present application may further include an input device 403 and an output device 404. The processor 401, the memory 402, the input device 403 and the output device 404 may be connected by a bus or in other manners. FIG. 4 uses connection by a bus as an example.

The input device 403 can receive input number or character information and generate key signal input related to user settings and function control of the electronic device for performing the speed planning method for self-driving according to any embodiment of the present application. The input device 403 may be, for example, a touchscreen, a keypad, a mouse, a trackpad, a touchpad, a pointing stick, one or more mouse buttons, a trackball or a joystick. The output device 404 may be, for example, a display device, an auxiliary lighting device (for example, an LED) or a haptic feedback device (for example, a vibration motor). The display device may include, but is not limited to, a liquid-crystal display (LCD), a light-emitting diode (LED) display or a plasma display. In some embodiments, the display device may be a touchscreen.

The various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting the data and instructions to the memory system, the at least one input device and the at least one output device.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), the Internet and a blockchain network.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

Additionally, an embodiment of the present application provides a vehicle, for example, a self-driving vehicle. The vehicle includes a vehicle body provided with the electronic device according to any embodiment of the present application. With the electronic device, the self-driving vehicle of this embodiment of the present application can perform speed planning, for example, global speed planning in a point-to-point driving task, by using the speed planning method according to any embodiment of the present application. Additionally, the vehicle body may be further provided with any one or more sensors and sensing modules for vehicle sensing. The self-driving vehicle can perform global speed planning by sensing surrounding environment and obstacles and by using the speed planning method according to any embodiment of the present application so that the self-driving vehicle can run safely.

With the solution of this embodiment of the present application, a related network-model-based reinforcement learning method is discarded, and table lookup replaces a neural network. It is possible to perform speed planning simply by determining the state table offline and then performing table lookup online. Therefore, not only not a large number of computing resources are occupied, but the global optimal solution of speed planning can also be obtained. Moreover, interpretability and mass production are ensured. Additionally, when the value iteration algorithm is performed, the original state grid is interpolated so that a more continuous state is obtained. On this basis, the value iteration algorithm is performed so that the optimal action is determined. In this manner, continuity of the planned actions and the accuracy of speed planning can be ensured.

The present application provides a speed planning method and apparatus for self-driving, a device, a medium and a vehicle so that not only not a large number of computing resources are occupied, but the global optimal solution of speed planning can also be obtained.

With the solution of the present application, table lookup replaces a neural network. It is possible to determine the target action of the current state simply by determining the state table offline based on reinforcement learning and then performing table lookup online. Therefore, not only not a large number of computing resources are occupied, but the global optimal solution of speed planning can also be obtained.

It is to be understood that various forms of the preceding flows may be used, with steps reordered, added or removed. For example, the steps described in the present application may be executed in parallel, in sequence or in a different order as long as the desired result of the technical solution disclosed in the present application is achieved. The execution sequence of these steps is not limited herein.

The scope of the present application is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present application are within the scope of the present application.

What is claimed is:

1. A speed planning method for self-driving, comprising:
   acquiring a current state of a vehicle, wherein the current state comprises at least a remaining running distance and a current speed; and
   interpolating actions based on the current state and a predetermined state table to obtain a target action of the current state, wherein the state table is determined based on a reinforcement learning method and comprises a plurality of states and a respective action performed in each of the plurality of states, and the respective action performed in the each of the plurality of states comprises at least acceleration;
   the method further comprising determining the state table, wherein the determining the state table comprises:
   creating a state grid based on discrete states, wherein the state grid comprises a plurality of sub-grids, and a vertex of each of the plurality of sub-grids indicates one state;
   interpolating states in the state grid based on discrete actions to obtain state interpolation information, wherein the state interpolation information indicates a next state obtained after an action is applied to a state in the state grid;
   determining a planned action corresponding to the each of the states in the state grid by performing value iteration according to a target cost function corresponding to a preset optimization target, based on the states in the state grid and the state indicated by the state interpolation information, and by use of a value iteration algorithm; and forming the state table by use of the states in the state grid and the determined planned actions corresponding to the states in the state grid.

2. The method of claim 1, wherein interpolating the states in the state grid based on the discrete actions to obtain the state interpolation information comprises:

performing barycentric interpolation of the states in the state grid based on the discrete actions to obtain the state interpolation information.

3. The method of claim 1, wherein the target cost function comprises a state cost function and an action cost function.

4. The method of claim 1, wherein interpolating the actions based on the current state and the predetermined state table to obtain the target action of the current state comprises:

determining a state range to which the current state belongs in the predetermined state table; and performing barycentric interpolation of actions corresponding to respective states in the state range to obtain the target action of the current state.

5. An electronic device, comprising:

at least one processor; and a memory communicatively connected to the at least one processor, wherein the memory stores instructions executable by the at least one processor, wherein the at least one processor is configured to:

acquire a current state of a vehicle, wherein the current state comprises at least a remaining running distance and a current speed; and interpolate actions based on the current state and a predetermined state table to obtain a target action of the current state, wherein the state table is determined based on a reinforcement learning method and comprises a plurality of states and a respective action performed in each of the plurality of states, and the respective action performed in the each of the plurality of states comprises at least acceleration;

wherein the at least one processor is further configured to determine the state table in the following manner:

creating a state grid based on discrete states, wherein the state grid comprises a plurality of sub-grids, and a vertex of each of the plurality of sub-grids indicates one state;

interpolating states in the state grid based on discrete actions to obtain state interpolation information, wherein the state interpolation information indicates a next state obtained after an action is applied to a state in the state grid;

determining a planned action corresponding to the each of the states in the state grid by performing value iteration according to a target cost function corresponding to a preset optimization target, based on the states in the state grid and the state indicated by the state interpolation information, and by use of a value iteration algorithm; and forming the state table by use of the states in the state grid and the determined planned actions corresponding to the states in the state grid.

6. The electronic device of claim 5, wherein the at least one processor is configured to interpolate the states in the state grid based on the discrete actions to obtain the state interpolation information in the following manner:

performing barycentric interpolation of the states in the state grid based on the discrete actions to obtain the state interpolation information.

7. The electronic device of claim 5, wherein the target cost function comprises a state cost function and an action cost function.

8. The electronic device of claim 5, wherein the at least one processor is configured to interpolate the actions based on the current state and the predetermined state table to obtain the target action of the current state in the following manner:

determining a state range to which the current state belongs in the predetermined state table; and performing barycentric interpolation of actions corresponding to respective states in the state range to obtain the target action of the current state.

9. A non-transitory computer-readable storage medium, storing computer instructions for causing a computer to perform:

acquiring a current state of a vehicle, wherein the current state comprises at least a remaining running distance and a current speed; and interpolating actions based on the current state and a predetermined state table to obtain a target action of the current state, wherein the state table is determined based on a reinforcement learning method and comprises a plurality of states and a respective action performed in each of the plurality of states, and the respective action performed in the each of the plurality of states comprises at least acceleration;

wherein the computer instructions are further configured to cause the computer to determine the state table by the following steps:

creating a state grid based on discrete states, wherein the state grid comprises a plurality of sub-grids, and a vertex of each of the plurality of sub-grids indicates one state;

interpolating states in the state grid based on discrete actions to obtain state interpolation information, wherein the state interpolation information indicates a next state obtained after an action is applied to a state in the state grid;

determining a planned action corresponding to the each of the states in the state grid by performing value iteration according to a target cost function corresponding to a preset optimization target, based on the states in the state grid and the state indicated by the state interpolation information, and by use of a value iteration algorithm; and forming the state table by use of the states in the state grid and the determined planned actions corresponding to the states in the state grid.

10. The non-transitory computer-readable storage medium of claim 9, wherein interpolating the states in the state grid based on the discrete actions to obtain the state interpolation information comprises:

performing barycentric interpolation of the states in the state grid based on the discrete actions to obtain the state interpolation information.

11. The non-transitory computer-readable storage medium of claim 9, wherein the target cost function comprises a state cost function and an action cost function.

12. The non-transitory computer-readable storage medium of claim 9, wherein interpolating the actions based on the current state and the predetermined state table to obtain the target action of the current state comprises:

determining a state range to which the current state belongs in the predetermined state table; and performing barycentric interpolation of actions corresponding to respective states in the state range to obtain the target action of the current state.

13. A vehicle, comprising a vehicle body, wherein the vehicle body is provided with an electronic device, and the electronic device comprises:

at least one processor; and a memory communicatively connected to the at least one processor, wherein the memory stores instructions executable by the at least one processor, wherein the at least one processor is configured to:

acquire a current state of a vehicle, wherein the current state comprises at least a remaining running distance and a current speed; and interpolate actions based on the current state and a predetermined state table to obtain a target action of the current state, wherein the state table is determined based on a reinforcement learning method and comprises a plurality of states and a respective action performed in each of the plurality of states, and the respective action performed in the each of the plurality of states comprises at least acceleration;

wherein the at least one processor is further configured to determine the state table in the following manner:

creating a state grid based on discrete states, wherein the state grid comprises a plurality of sub-grids, and a vertex of each of the plurality of sub-grids indicates one state;

interpolating states in the state grid based on discrete actions to obtain state interpolation information, wherein the state interpolation information indicates a next state obtained after an action is applied to a state in the state grid;

determining a planned action corresponding to the each of the states in the state grid by performing value iteration according to a target cost function corresponding to a preset optimization target, based on the states in the state grid and the state indicated by the state interpolation information, and by use of a value iteration algorithm; and forming the state table by use of the states in the state grid and the determined planned actions corresponding to the states in the state grid.

* * * * *